Sept. 29, 1925.  1,555,699
J. F. O'CONNOR
FRICTION SHOCK ABSORBING MECHANISM
Filed Aug. 31, 1922
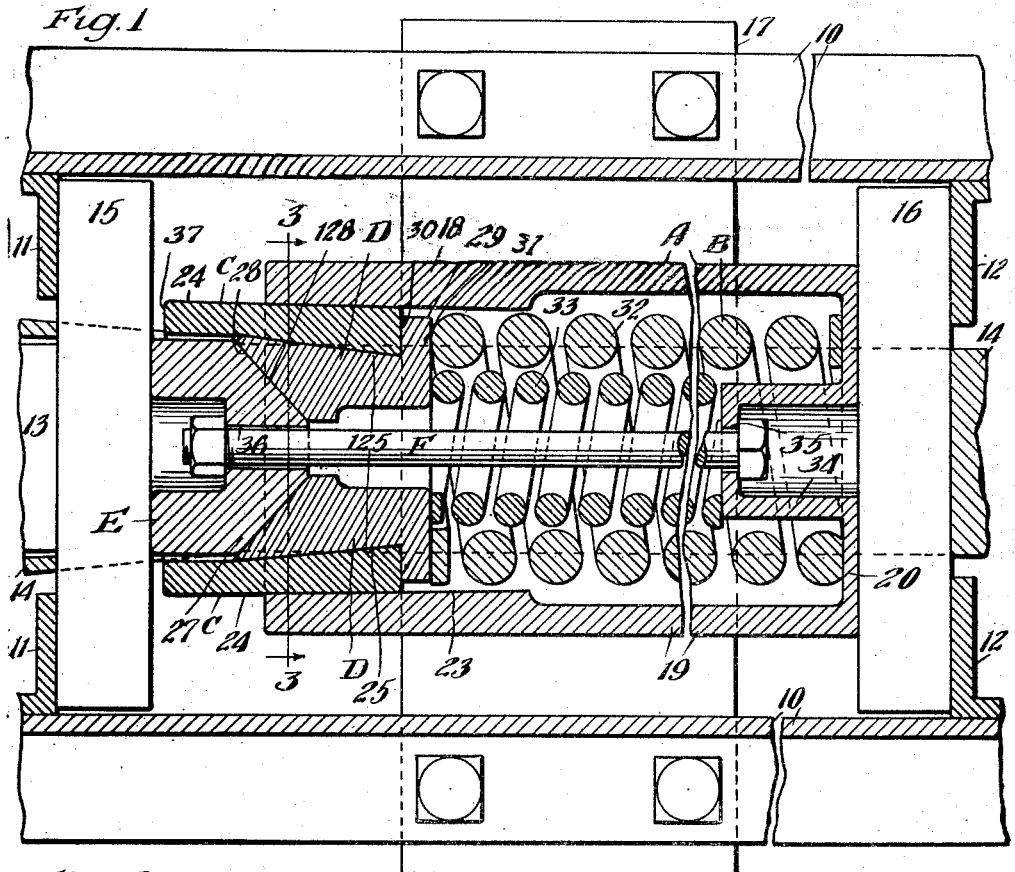
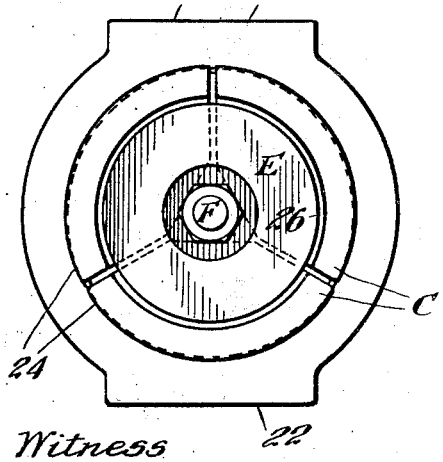
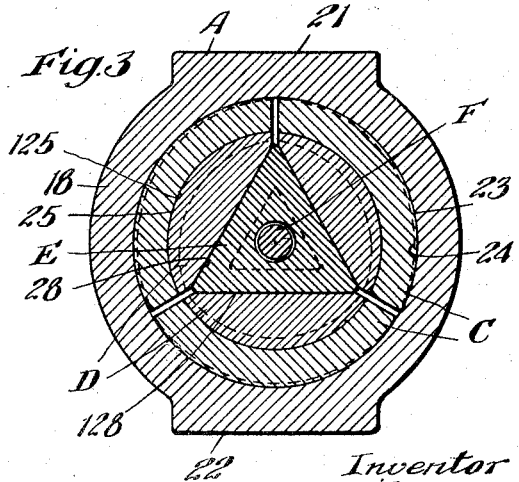
Witness
Wm. Geiger
Inventor
John F. O'Connor
By Geo. J. Haight
His Atty.

Patented Sept. 29, 1925.

1,555,699

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed August 31, 1922. Serial No. 585,446.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

My invention relates to improvements in friction shock absorbing mechanisms.

One object of this invention is to provide a friction shock absorbing mechanism especially adapted for use in railway draft riggings and wherein may be obtained any desired frictional capacity, with a certain and easy release without the use of any anti-friction rollers, anti-friction pads, or other special anti-friction means such as have heretofore been commonly employed.

Another object of the invention is to provide a friction shock absorbing mechanism of the character indicated, wherein is employed a collapsible wedge means having an acute or keen angled effect during the compressing action and a blunt angled effect in release, and without the use of any of the anti-friction devices heretofore employed.

Another object of the invention is to provide a friction shock absorbing mechanism of the character described wherein is employed a very slightly tapering friction shell in combination with friction shoes and spreading means therefor, the arrangement being such that the contraction of the shell upon removal of the actuating force, is utilized in a definite manner to break or collapse the spreading means to thereby positively assure a full and free release without the aid of the usual anti-friction devices heretofore employed for similar purposes.

Another object of the invention is to provide a friction shock absorbing mechanism of the character indicated, wherein is employed a follower, a friction shell, friction shoes and a spreading means, the friction shoes and spreading means having co-operating sets of engaging faces, certain of which produce keen angled wedging action in compression, and certain of which are of blunt, substantially non-wedge-acting effect, in compression, and of wedge-acting effect, in release, and in which the follower directly engages and moves the friction shoes after the wedging action has been set up.

Other objects of the invention will more clearly appear from the description and claims hereinafter following.

In the drawing forming a part of this specification, Figure 1 is a horizontal longitudinal sectional view of a portion of a railway draft rigging showing my improvement in connection therewith. Fig. 2 is a front end view of the friction shell, friction shoes and wedge block. And Fig. 3 is a vertical transverse sectional view taken substantially on the line 3—3 of Fig. 1.

In said drawing, 10—10 denote channel-shaped center or draft sills of a railway car to the inner faces of which are secured front stop lugs 11 and rear stop lugs 12. A portion of the draw bar is indicated at 13, the same being operatively connected to a yoke 14. Within the yoke 14 is disposed the shock absorbing mechanism proper, hereinafter described, and front and rear followers 15 and 16, respectively. The yoke and movable parts contained therein are adapted to be supported by a detachable saddle plate 17.

The friction shock absorbing mechanism proper, as shown, consists, broadly, of a combined friction shell and spring cage casting A; a spring resistance B; friction shoes C; wedge elements proper D; a pressure-transmitting block E; and a retainer bolt F.

The casting A has the friction shell proper 18 formed at the forward end, and the spring cage at the rear end, the spring cage being indicated by 19 and having an integral rear wall 20 adapted to co-act with the rear follower 16. The shell 18 is of generally cylindrical shape and is provided with an upper flat face 21 and a lower flat face 22, the lower face 22 being adapted to rest upon the yoke. The friction shell proper 18, is formed with an inner series of cylindrical rearwardly extending slightly inwardly tapering friction faces 23. The reason for making the interior faces 23 of the shell slightly inwardly tapered or converging, as above described, is to avoid any possibility of the mouth or outer end of the shell being of lesser dimension or diameter than any part of the shell inwardly thereof within such variations as are now permitted in commercial foundry practice. In other words, where a friction shell made by foundry process is primarily designed to be of uniform dimensions from end to end, it sometime happens that in the making of same, it will be found that the mouth of the shell is slightly contracted, even though the casting does not vary beyond the predetermined limits of variations permitted in commercial manufacture, and it is obvious that when such castings are produced, even though they cannot be rejected on inspection as outside of permissible variations, nevertheless if permitted to go into service without correction, would result in an impediment or obstruction of the full and easy release of the shoes. With my construction, where the shell is primarily designed with a slightly inward taper, the normal run of castings produced in the foundry will have such slight taper that even should a variation occur within the limits sanctioned by commercial practice, there will be no danger of any part of the shell inwardly of the mouth being of lesser dimension than that at the outer or mouth end thereof, so there will be no difficulties from this cause encountered in the release. In this connection, I wish to be understood as not intending to use a tapered friction shell of such acute taper as to produce a large amount of differential action, such as have heretofore been contemplated in some types of gears.

The friction shoes C are provided with outer cylindrical friction faces 24 of the same radius as the friction faces 23 and similarly slightly inclined relatively to the longitudinal axis of the mechanism so as to co-act with the friction faces 23 and always maintain full surface contact. The shoes C are also provided with inner cylindrical wedge faces 25, the wedge faces 25 extending rearwardly at an acute angle to the longitudinal axis of the shock absorbing mechanism. As herein shown, the friction shoes are three in number, symmetrically arranged with reference to the longitudinal axis of the shock absorbing mechanism, but it is obvious that a greater number of shoes may be employed.

The block E is formed with a cylindrical portion 26 of a diameter less than the distance between the inner faces of the friction shoes C when in normal position, as shown in Fig. 1 and is also formed with an inwardly projecting pyramidal portion 27 provided with wedge faces 28 inwardly inclined at a relatively blunt angle with reference to the longitudinal axis of the mechanism. As herein shown, the projection 27 of the wedge block E is of triangular cross section providing three blunt wedge faces. It is obvious, however, that a greater or lesser number may be employed to correspond with the number of wedge elements proper, D.

The wedge elements proper, D, as herein shown, are provided with outer cylindrical wedge faces 125 correspondingly inclined to and co-acting with the inner wedge faces 25 of the friction shoes C, and are also provided with inner flat faces 128, correspondingly inclined with the wedge faces 28 of the block E and co-acting therewith. As herein shown, the wedge elements D are provided corresponding in number to the wedge faces on the block E and the number of friction shoes C. Each of the wedge elements D has its rear end provided with a radially extending flange 29, thereby providing an abutment 30, co-acting with the inner end of the friction shoes C, and an abutment 31 for the spring resistance B.

The spring resistance B comprises an outer relatively heavy spring 32, and an inner relatively lighter spring 33, the heavy spring 32 being interposed between the rear wall 20 of the spring cage and the abutments 31 on the rear ends of the wedging elements proper, and the light spring 33 being interposed between the abutments 31 and the inner end of the hollow boss 34 inwardly projecting from the rear wall 20 of the spring cage.

The retainer bolt F passes through a perforation 35 in the boss 34, a perforation 36 in the block E and through the center of the spring resistance B, the function of the bolt being to hold the parts in assembled relation, and if desired, to maintain the spring under an initial compression.

The normal position of the parts is as shown most clearly in Fig. 1 wherein the shoes C are shown as held in slightly spaced relation with reference to the front follower 15 by the spring resistance B, co-acting with the flange 29 on the wedging elements D abutting the rear ends of the shoes C. In the preferred construction, the normal distance between the front ends 37 of the shoes C and the follower 15 is about one-fourth of an inch, but it is obvious that this distance may be varied in accordance with the requirements of the mechanism.

In the operation of my device, and assuming an inward or buffing movement of the draw bar, it is evident the block E will be forced inwardly in lines substantially parallel to the axis of the mechanism. Due to the bluntness of the angle of the engaging faces 28 and 128, no substantial wedging or spreading action occurs between the block E and the wedge elements D. The wedge elements D, however, do effect a true sliding, wedging or spreading action on the shoes C, by reason of the engaging sets of faces 25 and 125. The inward movement of the block E and the elements D will force the shoes C outwardly into heavy frictional contact with the shell 18 until the follower 15 has moved inwardly a sufficient distance to contact with the outer ends 37 of the shoes C, whereupon the shoes C will be moved by direct engagement with the follower 15. The shoes C remain substantially stationary until engaged by the follower due to inertia, the buffing action being in the nature of a blow projecting the block E and wedge elements inward suddenly.

During the wedging action, there will be produced a slight expansion of the shell 18. At the end of the compressive stroke, and upon removal of the actuating pressure, it is obvious that enormous forces will be stored up in the friction shell, and these forces will be exerted inwardly or laterally and perpendicular to the axis of the mechanism through the shoes C. Due to the angular arrangement of the wedge faces 25 and 125, which are at a relatively blunt angle with respect to the inwardly radially directed forces, no releasing action will occur on said faces, but on the contrary, the initial release or collapse of the friction elements will be mainly effected between the elements D and the block E at the faces 28 and 128, the latter extending at a relatively acute angle with respect to the radially and inwardly directed forces. The spring resistance F will exert a releasing effect on the wedge elements D and friction shoes C, restoring the parts to normal position as shown in Fig. 1.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a follower; of a friction shell having an interior longitudinally extending friction surface; friction shoes each directly cooperable with said shell and normally spaced from said follower and adapted, upon a predetermined relative movement of said follower and shell to be directly engaged by said follower, said shoes having inner faces extending at a relatively acute wedge angle with respect to the axis of said shell; a plurality of collapsible spreading elements cooperable with said shoes, each of said elements having an outer face extending at the same angle as and directly cooperable with a face of one of said shoes, and provided also with another face extending at a relatively blunt angle to the axis of said member; a pressure transmitting member co-acting with said follower having faces extended at the same inclination as and cooperable with said blunt angled faces of said elements; and a spring resistance continuously co-acting with said elements adapted to be compressed upon inward movement of said elements and said shoes relatively to the shell and adapted to restore said shoes and elements to normal position upon the removal of the actuating force.

2. In a friction shock absorbing mechanism, the combination with a follower; of a friction shell having interior longitudinally extending, inwardly converging friction surfaces; a spring resistance; friction shoes cooperable with said shell friction surfaces and normally spaced from said follower and permanently spaced from said spring resistance, said shoes being adapted upon a predetermined relative movement of said follower and shell to be directly engaged by said follower, said shoes having inner faces extended at a relatively acute wedging angle with respect to the axis of said shell; a plurality of collapsible spreading elements cooperable with said shoes and projecting rearwardly beyond the same and co-acting with said spring resistance, each of said elements having an outer face extending at the same angle as and directly cooperable with a face of one of said shoes, and provided also with an other face extending at a relatively blunt angle to the axis of said member; a pressure transmitting member co-acting with said follower having faces extending at the same inclination as and cooperable with said blunt angled faces of said elements.

3. In a friction shock absorbing mechanism, the combination with a follower; of a friction shell having interior longitudinally extending, inwardly converging friction surfaces; a friction unit comprising a plurality of friction shoes having outer friction surfaces cooperating with the friction surfaces of the shell; a plurality of collapsible spreading elements cooperable with said shoes and a single wedge block co-acting with said elements, said friction shoes cooperating with said shell and normally spaced from said follower and adapted upon a predetermined relative movement of said follower and shell to be directly engaged by said follower, said shoes having inner faces extending at a relatively acute wedging angle with respect to the axis of said shell, the inner face of each shoe being inclined with respect to the outer face thereof, each of said elements having an outer face extending at the same angle as and directly cooperable with a face of one of said shoes, and also provided with another face extending at a relatively blunt angle to the axis of said mechanism, said wedge block co-acting with said follower and having faces extending at the same inclination as and cooperable with said blunt angled faces of said elements; and a spring adapted to be compressed upon inward movement of said elements and shoes relatively to the shell and adapted to restore said shoes and elements to normal position upon removal of the actuating force.

4. In a friction shock absorbing mechanism, the combination with a follower; of a friction shell; a wedge movable by said follower; spreading elements co-acting with said wedge; friction shoes co-acting with the interior of said friction shell and having wedge faces thereon co-acting with wedge faces on said spreading elements, said shoes being adapted to be directly engaged by said follower upon predetermined relative movement of said follower and shell, said shoes and elements having inter-engaging abutment means thereon to normally hold the outer ends of said shoes spaced a predetermined distance from said follower; and a spring resistance adapted to be compressed upon inward movement of said elements and shoes relatively to the shell and adapted to restore said shoes and elements to normal position upon removal of the actuating force.

5. In a friction shock absorbing mechanism, the combination with a follower; of an inherently resilient expansible friction shell subject to limited expansion by radially applied forces and adapted to contract upon removal of said forces, said shell having an interior longitudinally extending friction surface; of friction shoes having outer friction surfaces cooperable with said shell and normally spaced from the follower and adapted upon a predetermined movement of said follower relative to the shell to be directly engaged by said follower, said shoes having inner faces extending at a relatively acute angle with respect to the axis of said shell, the inner face of each shoe being inclined to the outer face thereof; a plurality of collapsible spreading elements cooperable with said shoes, each of said elements having an outer face extending at the same angle as and directly cooperable with a face of one of said shoes and provided also with another inner face extending at a relatively blunt angle to the axis of said member; a pressure transmitting member co-acting with the follower having faces extending at the same inclination as and cooperable with said blunt angled faces of said elements; and a spring adapted to be compressed upon inward movement of said elements and shoes relatively to the shell and adapted to restore said shoes and elements to normal position upon removal of the actuating force.

6. In a friction shock absorbing mechanism, the combination with a follower; of a friction shell having a plurality of longitudinally extending, inwardly converging friction surfaces; a friction unit comprising an annular series of friction shoes, a plurality of collapsible spreading elements and a single wedge block, said friction shoes having outer friction surfaces cooperating with said shell friction surfaces, each of the spreading elements being provided with a wedge face, said friction shoes being normally spaced from said follower and adapted upon a predetermined relative movement of said follower and shell to be directly engaged by the follower, the inner surface of said shoes extending at a relatively acute wedging angle with respect to the axis of the shell, each of said spreading elements having an outer face extending at the same angle as and directly cooperable with the inner face of one of said shoes, and also provided with inner faces extending at a relatively blunt angle to the axis of said mechanism, said wedge block coacting with said follower and having faces extending at the same inclination as and cooperable with said blunt angle faces of said elements; and a spring resistance adapted to be compressed upon inward movement of said elements and shoes relatively to the shell.

In witness that I claim the foregoing I have hereunto subscribed my name this 11th day of August, 1922.

JOHN F. O'CONNOR.